United States Patent
Tazartes et al.

(10) Patent No.: US 9,429,426 B2
(45) Date of Patent: Aug. 30, 2016

(54) ADAPTIVE INERTIAL MEASUREMENT SYSTEM AND METHOD

(71) Applicants: Daniel A. Tazartes, West Hills, CA (US); Charles H. Volk, Newbury Park, CA (US)

(72) Inventors: Daniel A. Tazartes, West Hills, CA (US); Charles H. Volk, Newbury Park, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 264 days.

(21) Appl. No.: 14/161,270

(22) Filed: Jan. 22, 2014

(65) Prior Publication Data

US 2015/0204668 A1      Jul. 23, 2015

(51) Int. Cl.
G01C 19/56 (2012.01)
G01C 19/00 (2013.01)
G01C 19/72 (2006.01)

(52) U.S. Cl.
CPC .............. G01C 19/00 (2013.01); G01C 19/721 (2013.01)

(58) Field of Classification Search
CPC .. G01C 19/726; G01C 19/00; G01C 19/721; G01C 19/723; G01C 19/72
USPC .............. 73/504.01, 504.02, 504.04, 504.12; 356/460, 461, 464
See application file for complete search history.

(56) References Cited

U.S. PATENT DOCUMENTS

| | | | | |
|---|---|---|---|---|
| 5,473,430 A * | 12/1995 | Kemmler | ............. | G01C 19/726 356/464 |
| 5,598,489 A * | 1/1997 | Pavlath | ................ | G01C 19/721 250/227.19 |
| 5,923,424 A * | 7/1999 | Sanders | ............... | G01C 19/721 356/464 |
| 6,429,939 B1 * | 8/2002 | Bennett | .................. | G01C 19/72 356/463 |
| 6,775,356 B2 | 8/2004 | Salvucci et al. | | |
| 6,801,319 B2 * | 10/2004 | Szafraniec | ........... | G01C 19/721 356/460 |
| 7,715,014 B2 * | 5/2010 | Chen | .................... | G01C 19/721 356/464 |
| 7,933,020 B1 * | 4/2011 | Strandjord | ........... | G01C 19/727 356/461 |
| 8,213,018 B2 * | 7/2012 | Smith | .................. | G01C 19/721 356/460 |
| 8,717,575 B2 * | 5/2014 | Sanders | ............... | G01C 19/721 356/464 |
| 8,947,671 B2 * | 2/2015 | Strandjord | ........... | G01C 19/727 356/460 |
| 2004/0141225 A1 * | 7/2004 | Park | .................... | H01S 3/06754 359/333 |
| 2005/0191008 A1 * | 9/2005 | Anson | .................. | G01C 19/721 385/39 |
| 2007/0097374 A1 * | 5/2007 | Ren-Young | .......... | G01C 19/726 356/460 |

* cited by examiner

Primary Examiner — Helen Kwok
(74) Attorney, Agent, or Firm — Tarolli, Sundheim, Covell & Tummino LLP

(57) ABSTRACT

A control system includes a processor that operates one or more control loops that enable gyroscopic angular measurement for an inertial measurement unit (IMU). Each of the one or more control loops operates over a range of set points defined for each of the respective control loops. A dynamic loop adjuster receives environmental input data to determine environmental conditions for the IMU. The dynamic loop adjuster alters at least one of the set points for at least one of the one or more control loops operated by the processor based on the determined environmental conditions.

19 Claims, 5 Drawing Sheets

ADAPTIVE INERTIAL MEASUREMENT SYSTEM AND METHOD

TECHNICAL FIELD

This disclosure relates to an inertial measurement unit (IMU), and more particularly to a system and method that employs adaptive control loop adjustment based on environmental conditions of the IMU.

BACKGROUND

An inertial measurement unit (IMU) typically comprises three axes of angular motion sensing and three axes of acceleration sensing. Angular motion is measured by gyroscopes and acceleration is measured by linear accelerometers. The IMUs are employed for a variety of applications including stabilization, flight guidance, and navigation, for example. Requirements on IMUs can be demanding. The units typically need to be able to accurately sense very small quantities while operating in environments that range from quiescent to highly dynamic including high rotation rates, high accelerations, as well as high levels of vibration and shock. The IMUs, and particularly the gyroscopes and accelerometers are typically designed to operate through this full range of environments. However, this involves a number of design compromises which do not adequately address optimal operations over the range of environments.

A typical gyroscope control system for a single axis fiber optic gyroscope (FOG) configuration can include a primary angular rate rebalance loop as well as auxiliary control loops comprising a phase modulator scale factor control loop, an automatic gain control loop, an offset control loop, and an intensity control loop, for example. All of the control loops operate concurrently to ensure proper operation of the FOG as an angular rate sensor. The FOG mechanization includes both analog and digital elements. In particular, the optical signal from the FOG is amplified and converted via an A/D converter to digital form, allowing the control loops to operate in the digital domain. Certain control loop parameters are chosen for best operation. For example, the analog gain is high enough to permit the naturally occurring quiescent noise in the optics and analog electronics to toggle the least significant bit of the A/D converter, so that its resolution limitation can be overcome. On the other hand, this limits the maximum signal that the A/D converter can handle before it saturates. When high dynamics are present (e.g., high vibration or shock), the A/D may saturate, leading to errors in the gyroscope readout. Also, the auxiliary loops may respond to high dynamic signals and deviate from their optimal control points.

SUMMARY

This disclosure relates to gyroscopic control systems for angular measurement in an inertial measurement unit. In one aspect, a control system includes a processor that operates one or more control loops that enable gyroscopic angular measurement for an inertial measurement unit (IMU). Each of the one or more control loops operates over a range of set points defined for each of the respective control loops. A dynamic loop adjuster receives environmental input data to determine environmental conditions for the IMU. The dynamic loop adjuster alters at least one of the set points for at least one of the one or more control loops operated by the processor based on the determined environmental conditions.

In another aspect, a processor operates one or more control loops that enable gyroscopic angular measurement for an inertial measurement unit (IMU). Each of the one or more control loops operates over a range of set points defined for each of the respective control loops. A dynamic loop adjuster receives environmental input data to determine environmental conditions for the IMU. The dynamic loop adjuster alters at least one of the set points for at least one of the one or more control loops operated by the processor based on the determined environmental conditions. A fiber optic gyroscope (FOG) circuit generates a modulated optical signal representing angular motion for the IMU. An optical receiver converts the modulated output signal from the FOG to an electrical signal representing the angular motion of the IMU. An analog-to-digital converter (A/D) converts the electrical signal from the optical receiver to a digital signal for the processor. The processor employs an automatic gain control (AGC) loop to control the electrical signal gain of the optical receiver, employs an offset control loop to control electrical offsets in one or more circuits of the IMU, and a phase modulator scale factor loop to track sensitivity information of the modulated optical signal from the FOG.

In yet another aspect, a method includes executing one or more control loops that enable gyroscopic angular measurement for an inertial measurement unit (IMU). Each of the one or more control loops operates over a range of set points defined for each of the respective control loops. The method includes receiving environmental data relating to a dynamic condition of the IMU. This includes determining if the dynamic condition exceeds a predetermined threshold for the IMU based on the received environmental data. The method includes adjusting at least one of the set points for at least one of the one or more control loops if the dynamic condition exceeds the predetermined threshold.

DETAILED DESCRIPTION

Figure 1:
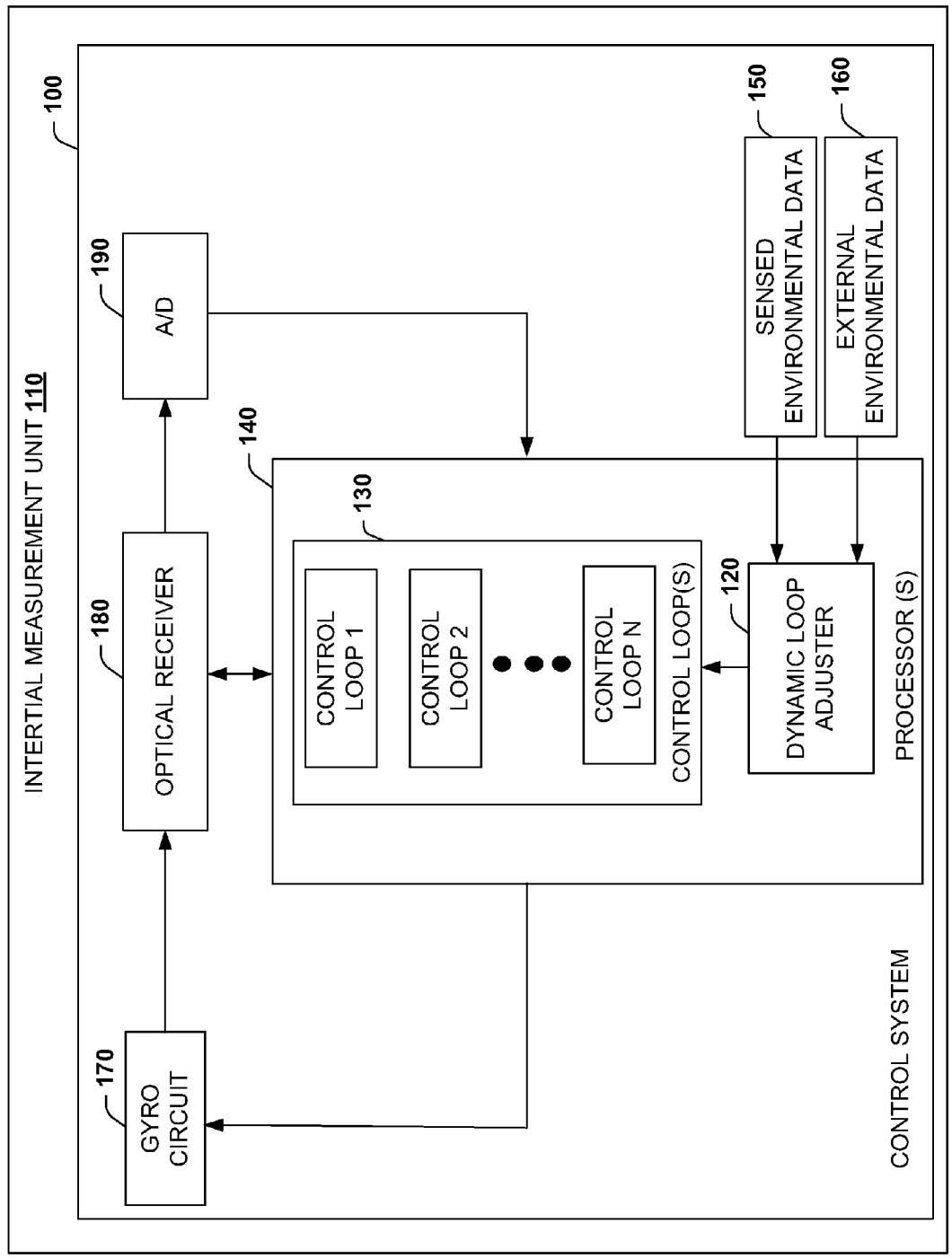
FIG. 1 illustrates an example of a single axis fiber optic gyroscope control system for an inertial measurement unit (IMU) that employs a dynamic loop adjuster to alter performance of one or more control loops in the system based on environmental conditions.

This disclosure relates to a system and method that dynamically alters one or more control loops in an inertial measurement unit (IMU) based on environmental conditions. The environmental conditions such as shock or vibration may be sensed internally on the IMU and/or provided via an interface from a remote location. The IMU is capable of dynamically adapting one or more closed-loop configurations such as an automatic gain control (AGC) loop, a phase modulator scale control loop and an offset control loop, for example, which are utilized to control a fiber optic gyroscope (FOG) of the IMU, and based on knowledge of the environment that the IMU operates within. Dynamically tailoring the capabilities of the FOG based on the environment, substantially ensures that the FOG is able to deliver accurate angular rate measurements during disturbances (e.g., shock, vibration, temperature change) that the FOG may experience in that particular environment.

The AGC control loop of the FOG can be utilized to control a variable gain amplifier during operation. The variable gain amplifier can be employed to receive an electrical representation of the optical signal (from a photodetector device), and then amplify that signal accordingly via the AGC control loop. Following the adaptation of the signal, the signal is supplied to an A/D converter, which then produces a digital representation of that optical signal for further processing. During normal conditions (situations where environmental disturbance is at a minimum or non-existent), the analog gain provided by the variable gain amplifier can be set by the AGC to a nominal value, which is a value that permits the A/D converter to capture an electrical signal of the optical signal at the highest resolution. However, under environmental disturbances, if the gain of the electrical signal is not reduced, the A/D converter can experience saturation. In order to mitigate the A/D converter from experiencing saturation and to maintain suitable operation of the FOG, the AGC control loop in response to the environmental disturbance (e.g., sensed or from remote data source) dynamically lowers the gain of the variable gain amplifier in order to ensure that the A/D converter does not experience saturation. To compensate for the decreased gain that was a result of the environmental disturbance, a commensurate (proportional) increase in gain can be provided on a digital side where larger word sizes (more bits) can accommodate a digital representation of the electrical optical signal. In order to provide a substantially degradation free optical signal during an environmental disturbance to the A/D converter, the AGC control loop can fine-tune the analog and/or digital gain until the environmental disturbance has ceased.

The phase modulator scale factor control loop, which is a slowly varying control loop, can be employed to track the sensitivity of the phase modulator in the FOG, and compensate for changes in the sensitivity by providing scale factor values to a phase modulator drive. The phase modulator drive utilizes the scale factor values to control optical phase and modulation depth in an approach that achieves an optimal signal-to-noise ratio (SNR) by the FOG. However, in order to minimize the effect of environmental disturbances (e.g., vibration) on the FOG operation, the phase modulator scale factor loop can be slowed or opened (e.g., last control command held) until the disturbance subsides to ensure that the phase modulator scale control loop is not changing the optical phase and modulation depth.

The offset control loop can be utilized to control errors in electronics. During normal operations, the offset control loop monitors the electronics of the FOG for any induced offsets and compensates for the offsets accordingly. However, in situations where the FOG is experiencing environmental disturbances, the offset control loop can be opened until the disturbance subsides in order that no erroneous offset compensation is introduced. Other control loops in the FOG can be similarly adapted based on environmental conditions. The dynamic adaptation of the select closed-loop configurations of the FOG, as described above, substantially ensures that the FOG is able to provide accurate angular rate measurements based on the knowledge of the environment in which the IMU operates.

FIG. 1 illustrates an example of a single axis fiber optic gyroscope control system 100 for an inertial measurement unit (IMU) 110 that employs a dynamic loop adjuster 120 to alter performance of one or more control loops 130 in the system based on environmental conditions. The control system 100 includes a processor 140 that operates the control loops 130, shown as loops 1 through N with N being a positive integer, to enable gyroscopic angular measurement for the inertial measurement unit (IMU) 110. Each of the one or more control loops 130 operates over a range of set points defined for each of the respective control loops. As used herein, the term processor can include a single processor, a collection of processors, and/or a combination of a processor and a gate array(s), for example as illustrated and described below with respect to FIG. 2. The processor 140 and/or gate array can include software and/or hardware components (including analog and/or digital controllers) for controlling the one or more control loops 130.

In some examples, the control loops 130 may be executed by the processor 140, executed by a separate gate array and/or executed as a combination between processor and gate array. The dynamic loop adjuster 120 receives environmental input data shown as sensed environmental data 150 and/or external environmental data 160 to determine environmental conditions for the IMU 110. The dynamic loop adjuster 120 alters at least one of the set points for at least one of the control loops 130 operated by the processor 140 based on the determined environmental conditions. In one example, the dynamic loop adjuster 120 issues a set point adjustment command to the processor 140 to change at least one of the set points for at least one of the one or more control loops 130 based on the determined environmental conditions.

As shown, the control system 100 includes a fiber optic gyroscope (FOG) circuit 170 that generates a modulated optical signal representing angular motion for the IMU 110. An optical receiver 180 converts the modulated output signal from the FOG circuit 170 to an electrical signal representing the angular motion of the IMU 110. An analog-to-digital converter (A/D) 190 converts the electrical signal from the optical receiver 180 to a digital signal for the processor 140. In some control loop examples, the processor 140 employs an automatic gain control (AGC) loop to control the electrical signal gain of the optical receiver 180. In another control loop example, an offset control loop can be employed to control electrical offsets in one or more circuits of the IMU 110. In yet another example, a phase modulator scale factor loop can be employed to track sensitivity information of the modulated optical signal from the FOG.

An interface (See FIG. 2) receives the environmental input data as external data 160 from a remote data source from the IMU 110. For example, the interface may receive information relating to when a vibration or shock event were about to occur on the IMU 110 (e.g., data relating to when a rocket firing were about to occur). The external environmental data 160 can include information relating to a vibration event, a shock event, a pressure change event, a humidity change event, or a temperature change event for the IMU. In addition to externally supplied environmental data 160, sensing circuits (not shown) on board the IMU 110 can be employed to sense the environmental conditions of the IMU. The sensing circuits can include at least one of an accelerometer sensor on the IMU 110, a vibration sensor on the IMU, a temperature sensor on the IMU, and an output value from an analog circuit (e.g., A/D 190) monitoring the one or more control loops 130 of the processor 140.

As will be illustrated and described below with respect to FIG. 2, a dynamic auxiliary control loop can be operated by the processor 140 that slows down output data changes or holds data in its last state to the offset control loop or the phase modulator scale factor loop based on determined higher dynamics of the environmental conditions. As used herein, the term higher dynamics refers to the conditions where higher vibration shock or other environmental changes have occurred. Lower dynamics refers to quiescent conditions on the IMU 110 when the environmental conditions have stabilized. In one specific example of loop adjustment by the processor 140, a modulation depth can be changed in the phase modulator scale factor loop by the processor based on the environmental conditions. With respect to the AGC control loop, the processor 140 can adjust a gain of the AGC loop based on the environmental conditions 150 and/or 160 in accordance with a digital gain factor and an analog gain factor. For example, the analog gain factor can be increased and the digital gain factor can be decreased during lower dynamic conditions to increase the sensitivity of the A/D 190. The analog gain factor can be decreased and the digital gain factor can be increased during higher dynamic conditions to mitigate saturation of the A/D 190. Triggering for control loop changes can be based on predetermined thresholds that define conditions of high or low dynamics.

Figure 2:
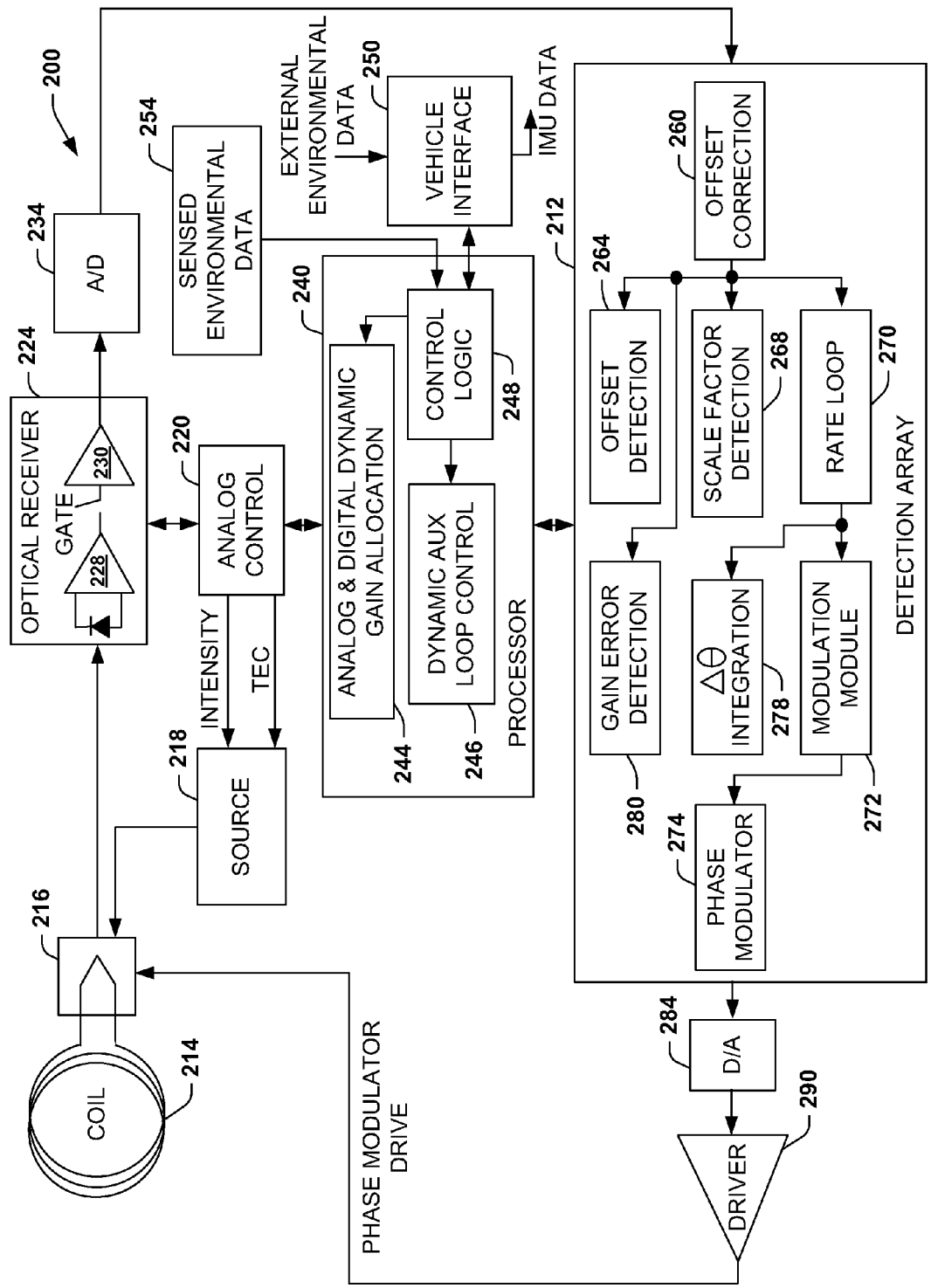
FIG. 2 illustrates an example of a single axis fiber optic gyroscope control system that employs a processor and a detection array to alter performance of one or more control loops in the system based on environmental conditions.

FIG. 2 illustrates an example of a single axis fiber optic gyroscope control system 200 that employs a processor 210 and a detection array 212 to alter performance of one or more control loops in the system based on environmental conditions. The system 200 includes a coil 214 that forms a gyroscope circuit with an integrated optics circuit 216. The integrated optics circuit 216 receives light from a source 218 which is controlled from an analog controller 220. The analog controller 220 controls a light intensity output to the source 218 and controls a thermoelectric cooler (TEC) output to maintain the temperature of the source 218. The analog controller 220 also controls the gain of an optical receiver 224 that receives a modulated optical output signal from the integrated optics circuit 216. The optical receiver 224 includes a first photodetector and amplifier 228 that converts the modulated optical output signal from the integrated optics circuit 216 to an electrical signal. Output from the amplifier 228 is amplified by a gated amplifier 230 which provides output to an analog-to-digital converter (A/D) 234. The analog controller 220 also regulates the gain of the amplifier 230 in the optical receiver 224.

Output from the A/D 234 is received by a detection array 238 that cooperates with a processor 240 to monitor or control the one or more control loops described herein. The processor 240 can include an analog and digital dynamic gain allocation module 244, a dynamic auxiliary loop control module 246, and a control logic module 248. Used herein, the term module can include hardware and/or software components which can also include analog and/or digital components. The analog and digital dynamic gain allocation module 244, the dynamic auxiliary loop control module 246, and the control logic module 248 collectively perform the dynamic loop adjuster that was described above with respect to FIG. 1. As shown, the control logic module 248 can receive environmental data from a vehicle interface 250 that receives external environmental data from a remote network source. The vehicle interface 250 can also supply IMU output data to a remote location (e.g., remote command center). The control logic module 248 can also receive sensed environmental data 254 from onboard sensors for the system 200. Based on the environmental data received by the control logic module 248, the analog and digital dynamic gain allocation module 244 and the dynamic auxiliary loop control module 246 can dynamically alter their respective set points based on detected changes in environmental conditions.

The detection array 212 (e.g., field-programmable gate array) can include an offset correction module 260 to correct electrical offsets of one or more circuits in the IMU. This can include an offset detection module 264 to detect the electrical offsets of one or more circuits in the IMU. A scale factor detection module 268 detects scale factor offsets in a phase modulator scale factor loop. A rate loop module 270 controls a modulation rate for the FOG. A modulation module 272 generates a modulation output sequence based on commands from the rate loop module 270. A phase modulator module 274 generates a digital command representing the modulation output sequence from the modulation module 272. A $\Delta\theta$ integration module 278 determines angular motion for the FOG and a gain error detection module 280 determines gain error for the AGC loop in the processor 240. Output from the phase modulator 274 is sent to a digital-to-analog converter (D/A) 284 which supplies an analog output to a driver 290 which supplies a phase modulator drive signal to the integrated optics circuit 216. It is noted that the modules and control functions described herein can be performed by the analog controller 220, the processor 240, and/or via the detection array 212.

As noted previously, the system 200 can provide an adaptive mode of operation for a gyroscope control system based on sensed and/or external environmental conditions. For example, in quiescent conditions, the analog gain can be set by the processor 240 at its normal value to permit randomization of the A/D resolution with the quiescent noise only. However, under high dynamic conditions, the analog gain can be reduced by the processor 240, allowing the A/D 234 to convert larger dynamic signals without saturating. The higher noise (as opposed to quiescent noise) introduced by the high dynamics can serve to randomize the least significant bit of the A/D 234, for example. In order to maintain proper operation of the gyro loop, the lower analog gain can be compensated by a commensurate increase in gain on the digital side where larger word sizes (more bits) can accommodate the resulting signals in the processor 240, FPGA, and/or ASIC, for example. Knowledge of the occurrence of high dynamic conditions can be provided by a user via the vehicle interface 250, and/or alternatively can be deduced as sensed data 254 by the IMU by using real-time monitoring of the magnitude of the A/D signals and/or angular rate and acceleration measurements, for example.

Figure 4:
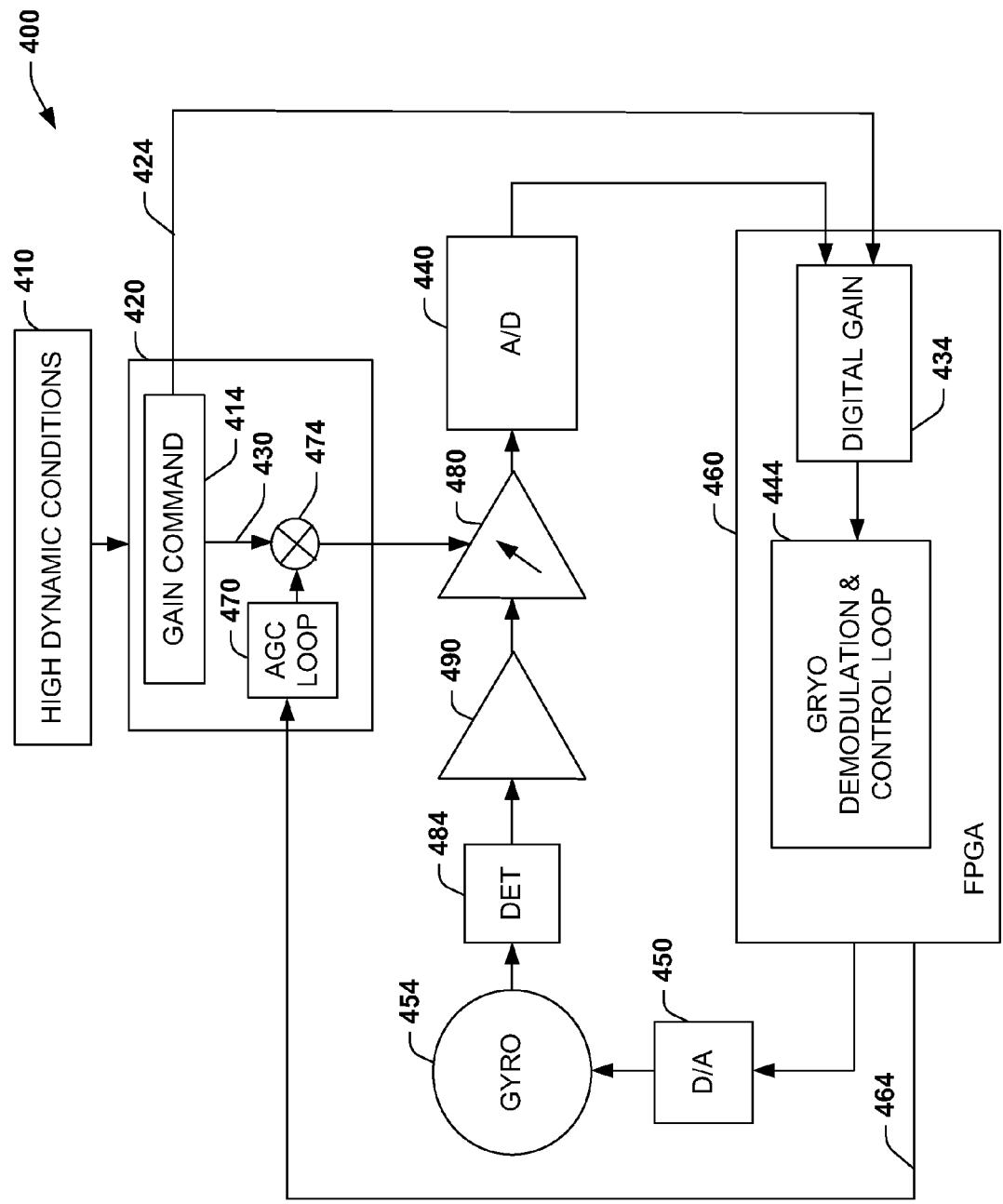
FIG. 4 illustrates an example system for dynamic gain allocation between digital and analog controllers in a single axis fiber optic gyroscope controller.

Automatic gain control (AGC) can be employed by the processor 240 to adjust the gain function. Upon determination that an analog gain reduction would be desirable, the AGC command can be shifted by a predetermined amount that would command a gain reduction factor (e.g., by a power of 2). The digital output of the A/D 234 can then be multiplied by the factor to restore a digital signal with a similar net scaling as the baseline. The AGC loop can then fine tune the AGC command to facilitate that the (analog× digital) gain product is maintained to ensure continuous operation of the gyro without substantial degradation. When the unit no longer experiences the high dynamics, as indicated by the user and/or internal determination, the gain can be reconfigured to its initial values to once again optimize for more benign environments. FIG. 4 below illustrates an example operation of the gain transfer.

As another example, since the auxiliary FOG loops are under software control and are in place to track slow long term variations, they can be slowed down and/or held at their last state in the event of high dynamic conditions. Again, a user indication or sensed indication of upcoming high dynamics can be used to trigger the auxiliary loop 246 to reduce gain or open. Real time monitoring of the A/D, gyro, and acceleration data can also be used for the trigger. The Auxiliary loops 246 can be updated at a relatively low rate (e.g., 50 Hz) using high speed data, thus there is adequate time to detect the dynamics. If additional time is needed, the loop updating can be delayed further, and/or values can be archived for restoration once the dynamics have been detected.

As an additional example, although the modulation depth can be preset to a value optimizing the signal-to-noise ratio (SNR), it is also possible to change the modulation value depending on conditions. For example, when it is beneficial to have the best SNR in a quiescent state, the modulation depth can be increased to the predetermined value. When it is beneficial to have the signal level maximized irrespective of quiescent noise (for example if there were additional noise due to environment), then the modulation depth can be restored to its normal value.

Figure 3:
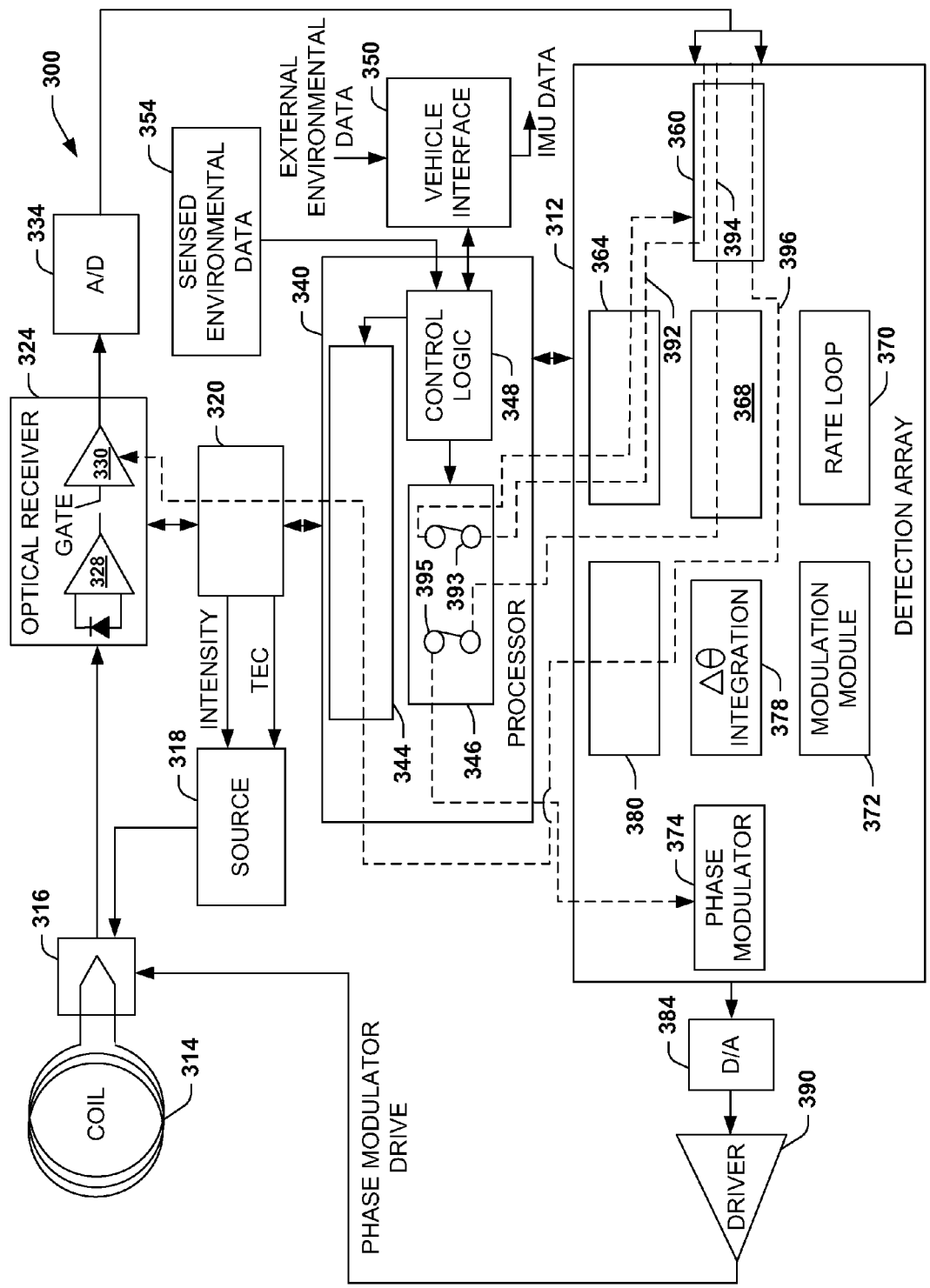
FIG. 3 illustrates example control loop paths for a single axis fiber optic gyroscope control system that employs a processor and a detection array to alter performance of one or more control loops in the system based on environmental conditions.

FIG. 3 illustrates example control loop paths for a single axis fiber optic gyroscope control system 300 that employs a processor and a detection array to alter performance of one or more control loops in the system based on environmental conditions. Before describing operations of the control loop paths, the various components of the system 300 are described. To facilitate illustration of the control loop paths, some of the module labels are removed to aid in observing the control loop paths. Similar to the system 200 described above, the system 300 includes a coil 314 that forms a gyroscope circuit with an integrated optics circuit 316. The integrated optics circuit 316 receives light from a source 318 which is controlled from an analog controller 320. The analog controller 320 controls a light intensity output to the source 318 and controls a thermoelectric cooler (TEC) output to maintain the temperature of the source 318. The analog controller 320 also controls the gain of an optical receiver 324 that receives a modulated optical output signal from the integrated optics circuit 316. The optical receiver 324 includes a first amplifier and photodetector 328 that converts the modulated optical output signal from the integrated optics circuit 316 to an electrical signal. Output from the amplifier 328 is amplified by a gated amplifier 330 which provides output to an analog-to-digital converter (A/D) 334. The analog controller 320 also regulates the gain of the amplifier 330 in the optical receiver 324.

Output from the A/D 334 is received by a detection array 312 that cooperates with a processor 340 to monitor or control the one or more control loops described herein. The processor 340 can include an analog and digital dynamic gain allocation module 344, a dynamic auxiliary loop control module 346, and a control logic module 348. As shown, the control logic module 348 can receive environmental data from a vehicle interface 350 that receives external environmental data from a remote network source. The vehicle interface 350 can also supply IMU output data to a remote location. The control logic module 348 can also receive sensed environmental data 354 from onboard sensors for the system 300. Based on the environmental data received by the control logic module 348, the analog and digital dynamic gain allocation module 344 and the dynamic auxiliary loop control module 346 can dynamically alter their respective set points based on detected changes in environmental conditions.

The detection array 312 (e.g., field-programmable gate array) can include an offset correction module 360 to correct electrical offsets of one or more circuits in the IMU. This can include an offset detection module 364 to detect the electrical offsets of one or more circuits in the IMU. A scale factor detection module 368 detects scale factor offsets in a phase modulator scale factor loop. A rate loop module 370 controls a modulation rate for the FOG. A modulation module 372 generates a modulation output sequence based on commands from the rate loop module 370. A phase modulator module 374 generates a digital command representing the modulation output sequence from the modulation module 372. A $\Delta\theta$ integration module 378 determines angular motion for the FOG and a gain error detection module 380 determines gain error for the AGC loop in the processor 340. Output from the phase modulator 374 is sent to a digital-to-analog converter (D/A) 384 which supplies an analog output to a driver 390 which supplies a phase modulator drive signal to the integrated optics circuit 316.

Output from the A/D 334 can be processed through several paths and modules within the detection array to derive data for the various control loops. In one example, an offset control loop 392 flows through the offset correction module 360, and a switching circuit 393 in the auxiliary control loop 346 and through the offset detection circuit to control offsets in the system 300. In another example, a phase modulator scale factor loop 394 flows though the offset control loop 360, the scale factor detection module 368, and a switching circuit 395 in the auxiliary control loop 346 to control the phase modulator module 374. In yet another example, an automatic gain control (AGC) loop 396 flows through the offset correction module 360, the gain error detection module 380, the analog and digital dynamic gain allocation module 344, and the analog controller 320, to control variable gain amplifier 330. The switching circuits 393 and/or 395 can hold control outputs to a last state during high dynamic conditions by opening a logic control switch within the auxiliary control module 346. Alternatively, the switching circuits 393 and/or 395 can slow the rate at which they update the offset correction module 360 and/or the phase modulator module 374, respectively, during high dynamic conditions.

FIG. 4 illustrates an example system 400 for dynamic gain allocation between digital and analog controllers in a single axis fiber optic gyroscope controller. A command to alter gains in the system is shown at 410 when high dynamic conditions are detected. A processor 420 receives the command 410 and issues a gain command 414 that includes a digital/analog gain adjustment factor 424 and an analog gain factor 430. The digital/analog gain adjustment factor 424 can be shifted by a scale factor K where analog gain is multiplied by 1/K and digital gain is multiplied by K, for example. The digital/analog gain adjustment factor 424 is supplied to a digital gain module 434 that also processes digitized analog values from an A/D 440. Output from the digital gain module 434 is processed by a gyro demodulation and control loop 444 which drives a D/A 450 to control a gyro circuit 454.

The demodulation and control loop 444 along with the digital gain module 434 can be executed by a field-programmable gate array (FPGA) 460, for example. Output 464 from the FPGA 460 drives an AGC loop 470 which is combined with analog gain 430 via combiner 474 to control variable gain amplifier (VGA) 480 which drives the A/D 440. Output from the gyro circuit 454 drives an inner analog loop beginning at detector 484 that drives a fixed gain amplifier 490 which in turn drives the VGA 480. As environmental conditions change, analog and digital gains can be scaled accordingly to the environmental conditions (e.g., sensed or supplied externally) by the factor K computed in the gain command 414 by the processor 420. As noted previously, the various modules and components described herein could be executed by a processor and/or a gate array. This can also include analog and/or digital processing and/or control elements.

Figure 5:
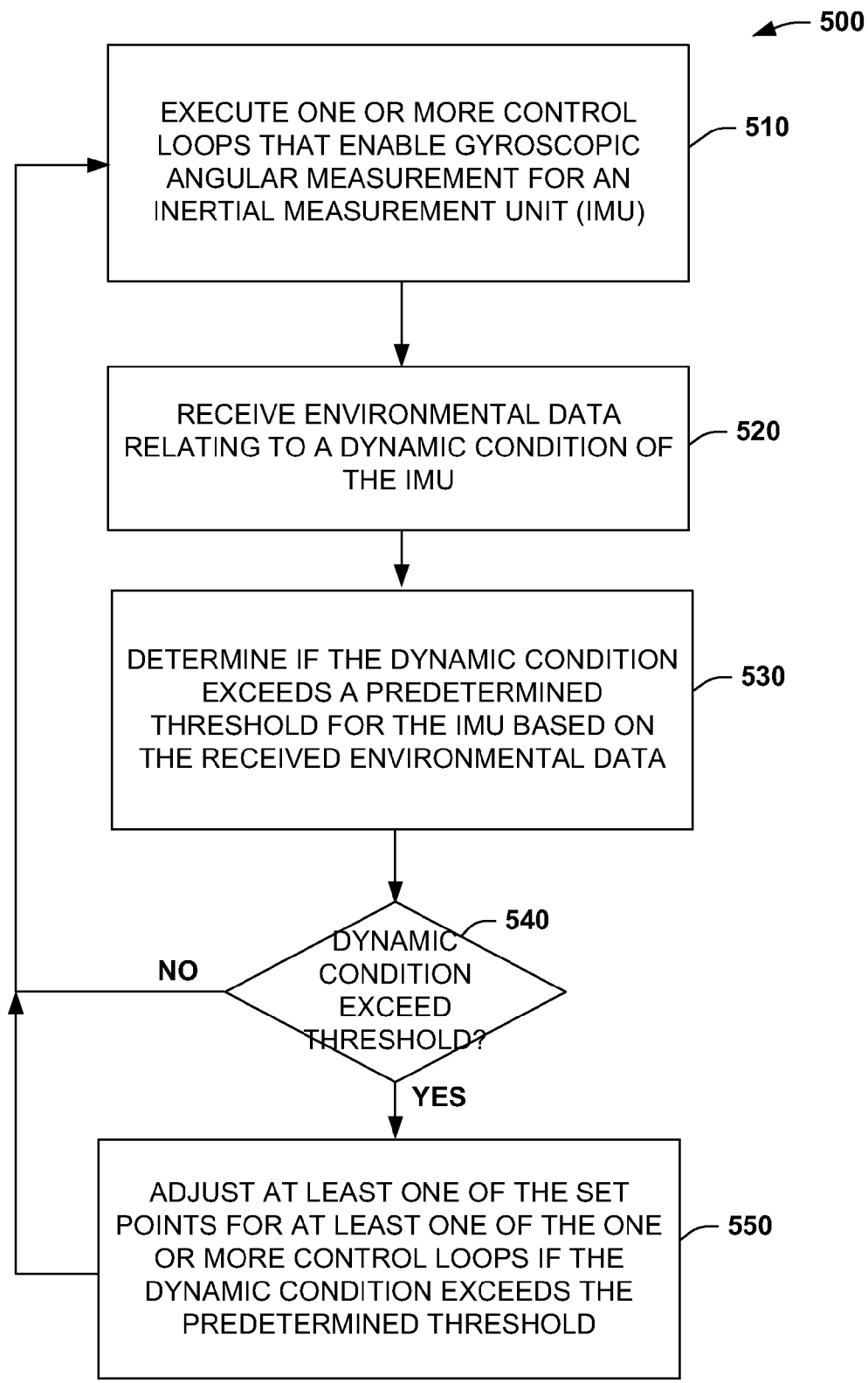
FIG. 5 illustrates an example of a method for controlling a single axis fiber optic gyroscope for an internal measurement unit (IMU).

In view of the foregoing structural and functional features described above, a methodology in accordance with various aspects of the present invention will be better appreciated with reference to FIG. 5. While, for purposes of simplicity of explanation, the methodology is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. The various acts of the method depicted in FIG. 5 can be executed automatically such as via a processor, computer, and/or controller configured with executable instructions to carry out the various acts described herein. Moreover, discrete circuit control implementations are possible in addition to hybrid controls that include both discrete and integrated circuit processing elements.

FIG. 5 illustrates an example of a method 500 for controlling a single axis fiber optic gyroscope for an inertial measurement unit (IMU). At 510, the method 500 includes executing one or more control loops that enable gyroscopic angular measurement for an inertial measurement unit (IMU) (e.g., via processor 140 of FIG. 1). Each of the one or more control loops operates over a range of set points defined for each of the respective control loops. At 520, the method 500 includes receiving environmental data relating to a dynamic condition of the IMU (e.g., via interface 250 or sensed data 254 of FIG. 2). At 530, the method 500 includes determining if the dynamic condition exceeds a predetermined threshold for the IMU based on the received environmental data (e.g., via processor 140 of FIG. 1). If the predetermined threshold is not exceeded at 540, the method proceeds back to 510 to control the one or more control loops. If the predetermined threshold has been exceeded at 540, the method 500 proceeds to 550. At 550, the method 500 adjusts at least one of the set points for at least one of the one or more control loops if the dynamic condition exceeds the predetermined threshold.

Although not shown, the method 500 can also include receiving the environmental data from a remote data source or receiving the environmental data from a sensor associated with the IMU. The method 500 can also include adjusting at least one of an automatic gain control (AGC) loop, an offset loop, or a phase modulator scale factor loop based on the dynamic condition, wherein a gain of the AGC loop is adjusted in accordance with a digital gain factor and an analog gain factor, wherein the analog gain factor is increased and the digital gain factor is decreased during low dynamic conditions, or the analog gain factor is decreased and the digital gain factor is increased during high dynamic conditions.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A control system, comprising:
   a processor that adjusts at least one of an automatic gain control (AGC) loop, an offset loop, and a phase modulator scale factor loop based on environmental conditions for an inertial measurement unit (IMU), wherein a gain of the AGC loop is adjusted by the processor in accordance with a digital gain factor and an analog gain factor, wherein the analog gain factor is increased and the digital gain factor is decreased during low dynamic conditions, or the analog gain factor is decreased and the digital gain factor is increased during high dynamic conditions, wherein each of the at least one of the AGC loop, the offset loop, and the phase modulator scale loop operates over a range of set points defined for each respective control loop.

2. The control system of claim 1, further comprising a dynamic loop adjuster that:
   receives environmental input data;
   determines the environmental conditions for the IMU based on the received environmental input data; and
   issues a set point adjustment command to the processor to adjust at least one of the set points for at least one of the AGC loop, the offset loop, and the phase modulator scale factor loop based on the determined environmental conditions.

3. The control system of claim 2, further comprising an interface that receives the environmental input data as external data from a remote data source from the IMU.

4. The control system of claim 3, wherein the external data includes information relating to a vibration event, a shock event, a pressure change event, a humidity change event, or a temperature change event for the IMU.

5. The control system of claim 1, further comprising a sensing circuit to sense the environmental conditions of the IMU.

6. The control system of claim 5, wherein the sensing circuit includes at least one of an accelerometer sensor on the IMU, a vibration sensor on the IMU, a temperature sensor on the IMU, and an output value from an analog circuit monitoring the one or more control loops of the processor.

7. The control system of claim 1, further comprising:
   a fiber optic gyroscope (FOG) circuit that generates a modulated optical signal representing angular motion for the IMU;
   an optical receiver to convert the modulated output signal from the FOG to an electrical signal representing the angular motion of the IMU; and
   an analog-to-digital (A/D) converter to convert the electrical signal from the optical receiver to a digital signal for the processor, wherein the processor employs the AGC loop to control an electrical signal gain of the optical receiver, employs the offset control loop to control electrical offsets in one or more circuits of the IMU, and the phase modulator scale factor loop to track sensitivity information of the modulated optical signal from the FOG.

8. The control system of claim 7, further comprising a dynamic auxiliary control loop operated by the processor that slows down output data changes or holds data in its last state to the offset control loop or the phase modulator scale factor loop based on determined higher dynamics of the environmental conditions.

9. The control system of claim 8, wherein a modulation depth is changed in the phase modulator scale factor loop by the processor based on the environmental conditions.

10. The control system of claim 7, wherein the analog gain factor is increased and the digital gain factor is decreased during low dynamic conditions to increase the sensitivity of the A/D converter, or the analog gain factor is decreased and the digital gain factor is increased during high dynamic conditions to mitigate saturation of the A/D converter.

11. The control system of claim 7, further comprising a detection array that cooperates with the processor to monitor or control at least one of the AGC loop, the offset loop, and the phase modulator scale factor loop.

12. The control system of claim 11, an offset correction module to correct electrical offsets of one or more circuits in the IMU, an offset detection module to detect the electrical offsets of the one or more circuits in the IMU, a scale factor detection module to detect scale factor offsets in the phase modulator scale factor loop, a rate loop module to control a modulation rate for the FOG, a modulation module that generates a modulation output sequence based on commands from the rate loop module, a phase modulator module that generates a digital command representing the modulation output sequence from the modulation module, a AO integration module to determine angular motion for the FOG, and a gain error detection module to determine gain error for the AGC loop.

13. A system, comprising:
  a processor that operates one or more control loops that enable gyroscopic angular measurement for an inertial measurement unit (IMU), wherein each of the one or more control loops operates over a range of set points defined for each of the respective control loops;
  a dynamic loop adjuster that receives environmental input data to determine environmental conditions for the IMU, wherein the dynamic loop adjuster alters at least one of the set points for at least one of the one or more control loops operated by the processor based on the determined environmental conditions;
  a fiber optic gyroscope (FOG) circuit that generates a modulated optical signal representing angular motion for the IMU;
  an optical receiver to convert the modulated output signal from the FOG to an electrical signal representing the angular motion of the IMU; and
  an analog-to-digital (A/D) converter to convert the electrical signal from the optical receiver to a digital signal for the processor, wherein the processor employs an automatic gain control (AGC) loop to control the electrical signal gain of the optical receiver, employs an offset control loop to control electrical offsets in one or more circuits of the IMU, and a phase modulator scale factor loop to track sensitivity information of the modulated optical signal from the FOG.

14. The system of claim 13, further comprising an interface that receives the environmental input data as external data from a remote data source from the IMU.

15. The system of claim 13, further comprising a sensing circuit to sense the environmental conditions of the IMU.

16. The system of claim 13, further comprising a dynamic auxiliary control loop operated by the processor that slows down output data changes or holds data in its last state to the offset control loop or the phase modulator scale factor loop based on determined higher dynamics of the environmental conditions.

17. The system of claim 13, wherein the processor adjusts a gain of the AGC loop based on the environmental conditions in accordance with a digital gain factor and an analog gain factor, wherein the analog gain factor is increased and the digital gain factor is decreased during low dynamic conditions to increase the sensitivity of the A/D converter, or the analog gain factor is decreased and the digital gain factor is increased during high dynamic conditions to mitigate saturation of the A/D converter.

18. A method, comprising:
  executing, by a processor, at least one of an automatic gain control (AGC) loop, an offset loop, and a phase modulator scale factor loop that enable gyroscopic angular measurement for an inertial measurement unit (IMU), wherein each of the at least one of the AGC loop, the offset loop, and the phase modulator scale loop operates over a range of set points defined for each of the respective control loop;
  receiving, by the processor, environmental data relating to a dynamic condition of the IMU;
  determining, by the processor, if the dynamic condition exceeds a predetermined threshold for the IMU based on the received environmental data; and
  adjusting, by the processor, at least one of the AGC loop, the offset loop, and the phase modulator scale factor loop based on the determining, wherein a gain of the AGC loop is adjusted in accordance with a digital gain factor and an analog gain factor, wherein the analog gain factor is increased and the digital gain factor is decreased during low dynamic conditions, or the analog gain factor is decreased and the digital gain factor is increased during high dynamic conditions.

19. The method of claim 18, further comprising receiving, by the processor, the environmental data from a remote data source or receiving the environmental data from a sensor associated with the IMU.

* * * * *